(12) United States Patent
Lee et al.

(10) Patent No.: US 7,470,954 B2
(45) Date of Patent: Dec. 30, 2008

(54) FABRICATION METHOD FOR ARRANGING ULTRA-FINE PARTICLES

(75) Inventors: Seung-Heon Lee, Daejeon (KR); Frédéric S. Diana, Santa Clara, CA (US); Antonio Badolato, Santa Barbara, CA (US); Pierre M. Petroff, Santa Barbara, CA (US); Edward J. Kramer, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/274,916

(22) Filed: Nov. 14, 2005

(65) Prior Publication Data

US 2006/0154466 A1  Jul. 13, 2006

Related U.S. Application Data

(62) Division of application No. 10/759,589, filed on Jan. 15, 2004, now Pat. No. 6,989,324.

(51) Int. Cl.
*H01L 29/94* (2006.01)
*H01L 31/062* (2006.01)

(52) U.S. Cl. ...................................... 257/331
(58) Field of Classification Search ......... 438/604–610, 438/939, 949; 423/600, 636; 257/244, 284, 257/330–332, 391, 521
See application file for complete search history.

(56) References Cited

OTHER PUBLICATIONS

Akinaga, H., S. Miyanishi, K. Tanaka, W. Van Roy, and K. Onodera, Appl. Phys. Lett. 76, 97 (2000).
Diana, F. S., S.-H. Lee, R. A. Rachel, E. J. Kramer, and P. M. Petroff, Nano Lett. 3, 891 (2003).
Gigli, G., R. Rinaldi, C. Turco, P. Visconti, R. Cingolani, and F. Cacoalli, Appl. Phys. Lett. 73, 3926 (1998).
Guo, Q., X. Teng, S. Rahman, and H. Yang, J. Am. Chem. Soc. 125, 630 (2003).
Hidber, P. C., W. Helbig, E. Kim, and G. M. Whitesides, Langmuir 12, 1375 (1996).
Hua, F., T. Cui, and Y. Lvov, Langmuir 18, 6712 (2002).
Hua, F., Y. Lvov, and T. Cui, Nano Lett. 2, 1219 (2002).
Lee, I., H. Zheng, M. F. Rubner, and P. T. Hammond, Adv. Mater. 14, 572 (2002).
Lin, X. M., R. Parthasarathy, and H. M. Jaeger, Appl. Phys. Lett. 78, 1915 (2001).
Misner, M. J., H. Skaff, T. Emrick, and T. P. Russell, Adv. Mater. 15, 221 (2003).
Palacin, S., P. C. Hidber, J.-P. Bourgoin, C. Miramond, C. Fermon, and G. M. Whitesides, Chem. Mater. 8, 1316 (1996).
Puntes, V. F., K. M. Krishnan, and A. P. Alivisatos, Science, 291, 2115 (2001).
Spatz, J. P., V. Z.-H. Chan, S. Möβmer, F.-M. Kamm, A. Plettl, P. Ziemann, and M. Möller, Adv. Mater. 14, 1827 (2002).

(Continued)

*Primary Examiner*—Calvin Lee
(74) *Attorney, Agent, or Firm*—Berliner & Associates

(57) ABSTRACT

A method and resultant device, in which metal nanoparticles are self-assembled into two-dimensional lattices. A periodic hole pattern (wells) is fabricated on a photoresist substrate, the wells having an aspect ratio of less than 0.37. The nanoparticles are synthesized within inverse micelles of a polymer, preferably a block copolymer, and are self-assembled onto the photoresist nanopatterns. The nanoparticles are selectively positioned in the holes due to the capillary forces related to the pattern geometry, with a controllable number of particles per lattice point.

14 Claims, 3 Drawing Sheets

OTHER PUBLICATIONS

Spatz, J. P., S. Mössmer, C. Hartmann, M. Möller, T. Herzog, M. Krieger, H.-G. Boyen, P. Ziemann, and B. Kabius, Langmuir 16, 407 (2000).

Sun, S., C. B. Murray, D. Weller, L. Folks, and A. Moser, Science, 287, 1989 (2000).

Suzuki, K., R. A. Hogg, and Y. Arakawa, J. Appl. Phys. 85, 8349 (1999).

Werts, M. H. V., M. Lambert, J.-P. Bourgoin, and M. Brust, Nano Lett. 2, 43 (2002).

Yin, Y., Y. Lu, B. Gates, and Y. Xia, J. Am. Chem. Soc. 123, 8718 (2001).

Yokoyama, H., T. E. Mates, and E. J. Kramer, Macromolecules 33, 1888 (2000).

Zheng, H., I. Lee, M. F, Rubner, and P. T. Hammond, Adv. Mater. 14, 569 (2002).

Journal of Applied Physics, vol. 95, No. 10, dated May 15, 2004 entitled "Self-assembling nonoparticles into holographic nanopatterns"; Seung-Heon Lee, et al., pp. 5922-5925.

FIG. 3A
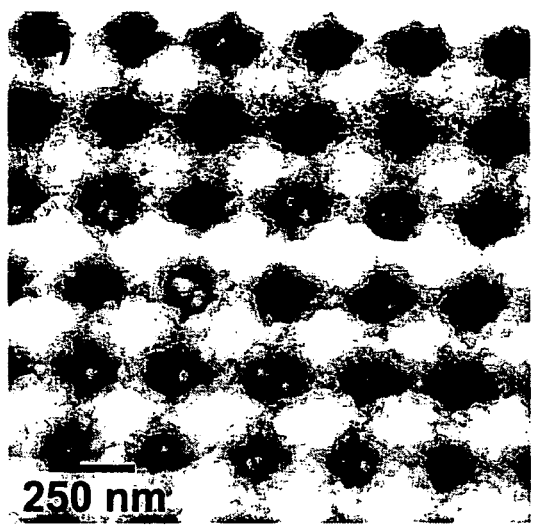
FIG. 3B
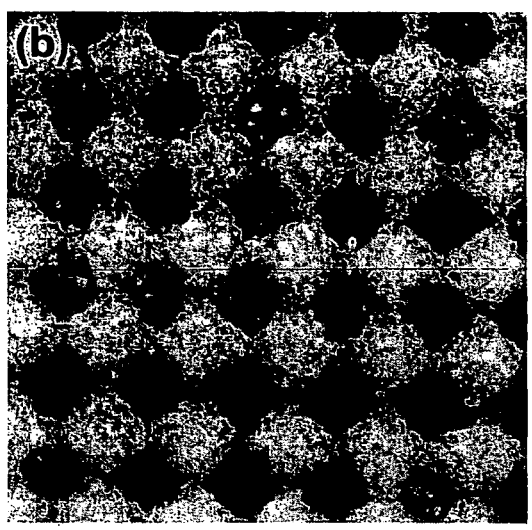
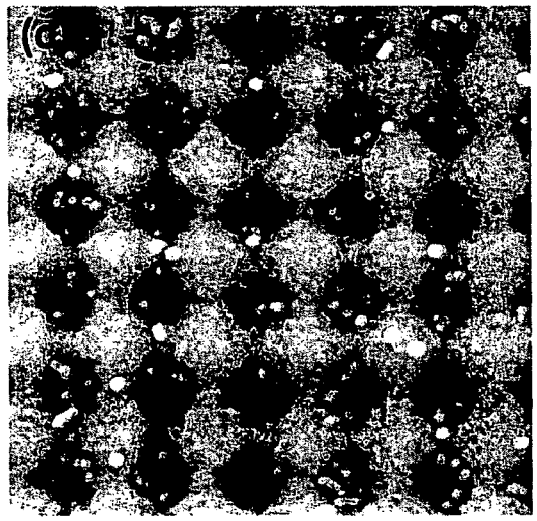
FIG. 3C
FIG. 4
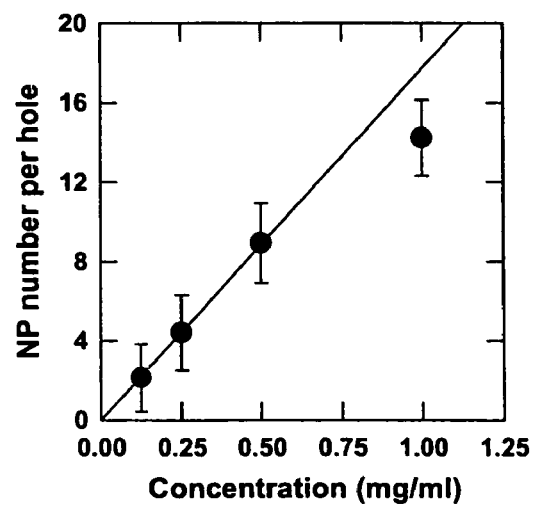

FABRICATION METHOD FOR ARRANGING ULTRA-FINE PARTICLES

CROSS REFERENCE TO RELATED APPLICATION

This application is a divisional of application Ser. No. 10/759,589 filed Jan. 15, 2004 now U.S. Pat. No. 6,989,324.

FIELD OF THE INVENTION

The field of art to which the invention pertains relates to the fabrication methods that enable control of the number and positioning of a fixed number of ultra-fine particles or nanoclusters arranged into wells prefabricated on substrates.

BACKGROUND OF THE INVENTION

Micro- or nano-patterns of nanoparticles have recently attracted considerable interest due to their possible applications in high-density magnetic storage media (S. Sun et al. 2000), magneto-optical devices (H. Akinaga et al. 2000), and quantum dot displays (K. Suzuki et al. 1999). To obtain these particle patterns, various methods have been successfully applied such as selective wetting on a patterned self-assembled monolayer (SAM) (S. Palacin et al. 1996), layer-by-layer (LbL) self-assembly on a patterned SAM (H. Zheng et al. 2002; and I. Lee et al. 2002), LbL self-assembly combined with lift-off and/or metal mask techniques (F. Hua et al. 2002a; F. Hua et al. 2002b), electron beam lithography after deposition of a nanoparticle layer (X. M. Lin et al. 2001; M. H. V. Werts et al. 2002), and micro-contact printing (μCP) of nanoparticles using soft poly(dimethylsiloxane) (PDMS) network stamps (P. C. Hidber et al. 1996 and Q. Guo et al. 2003). However, the first (S. Palacin et al. 1996) and the second methods (H. Zheng et al. 2002; and I. Lee et al. 2002) need pre-patterned SAM layers on a substrate typically prepared by μCP with PDMS stamps, which involves additional fabrication steps of original masks and stamps. The third method (F. Hua et al. 2002a; F. Hua et al. 2002b) involves many steps such as conventional lithography to prepare photoresist patterns and lift-off and/or metal mask after LbL self-assembly. In the fourth technique (X. M. Lin et al. 2001; M. H. V. Werts et al. 2002) it is crucial to prepare dense mono- or multilayers of nanoparticles on a substrate surface, which may not be easy in a large area fabrication. The last method (P. C. Hidber et al. 1996 and Q. Guo et al. 2003) also needs dense mono- or multilayers of nanoparticles on a PDMS stamp and sometimes additional adhesion promoters are needed for smooth pattern transfer to another substrate. With the exception of e-beam lithography (M. H. V. Werts et al. 2002) the size and periodicity of patterns obtained by the above methods are typically on the order of microns.

Recently, a few research groups used the capillary forces of a receding liquid front to self-assemble particles into physically templated wells on both micrometer and nanometer scales (Y. Yin et al. 2001, J. P. Spatz et al. 2002, and M. J. Misner et al. 2003). Particularly, Spatz et al. (2002) reported an ordering of single polystyrene-block-poly(2-vinylpyridine) (PS-PVP) micelle loaded with tetrachloroauric acid into each regularly-spaced hole of photoresist patterns with an aspect ratio of a=0.4~2.7 prepared by e-beam lithography. They observed a circular depletion zone without nanoparticles around a hole, which was consistent with the capillary force effect. Misner et al. (2003) also reported the self-assembly of nanoparticles using capillary forces into block copolymer templates of perpendicularly oriented cylindrical wells obtained by UV irradiation. They found that nanoparticles with a diameter larger than 10 nm could not be accommodated perfectly in the cylindrical wells due to the small diameter (~20 nm) of the wells.

BRIEF SUMMARY OF THE INVENTION

The present invention overcomes the foregoing drawbacks by providing a novel method and resultant device, in which metal nanoparticles are self-assembled into two-dimensional lattices. A periodic hole pattern (wells) is fabricated on a photoresist substrate, the wells having an aspect ratio of less than 0.37. The nanoparticles are synthesized within inverse micelles of polymers, preferably block copolymers, and are self-assembled onto the photoresist nanopatterns. The nanoparticles are selectively positioned in the holes due to the capillary forces related to the pattern geometry, with a controllable number of particles per lattice point.

In a specific embodiment, monodisperse cobalt nanoparticles are synthesized within inverse micelles of PS-PVP copolymer in toluene. A periodic hole pattern of photoresist is fabricated on a GaAs substrate by holographic lithography, and the nanoparticles as prepared above are self-assembled onto the photoresist nanopatterns by dip or spin casting.

Features and advantages of the invention will be described hereinafter which form the subject of the invention. It should be appreciated by those skilled in the art that the conception and specific embodiment disclosed may be readily utilized as a basis for modifying or designing other surfaces and substrates for carrying out the same purposes of the present invention. It should also be realized by those skilled in the art that such equivalent constructions do not depart from the spirit and scope of the invention. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIGS. 3(a), 3(b) and 3(c) are scanning force microscope height images of cobalt particle arrays using nanoparticle concentrations respectively of 0.125 mg/ml (FIG. 3(a)), 0.5 mg/ml (FIG. 3(b)), and 1.0 mg/ml (FIG. 3(c)); and FIG. 4 is a graph showing the relationship between nanoparticle number per hole and nanoparticle concentration.

DETAILED DESCRIPTION OF THE INVENTION

Figure 1:
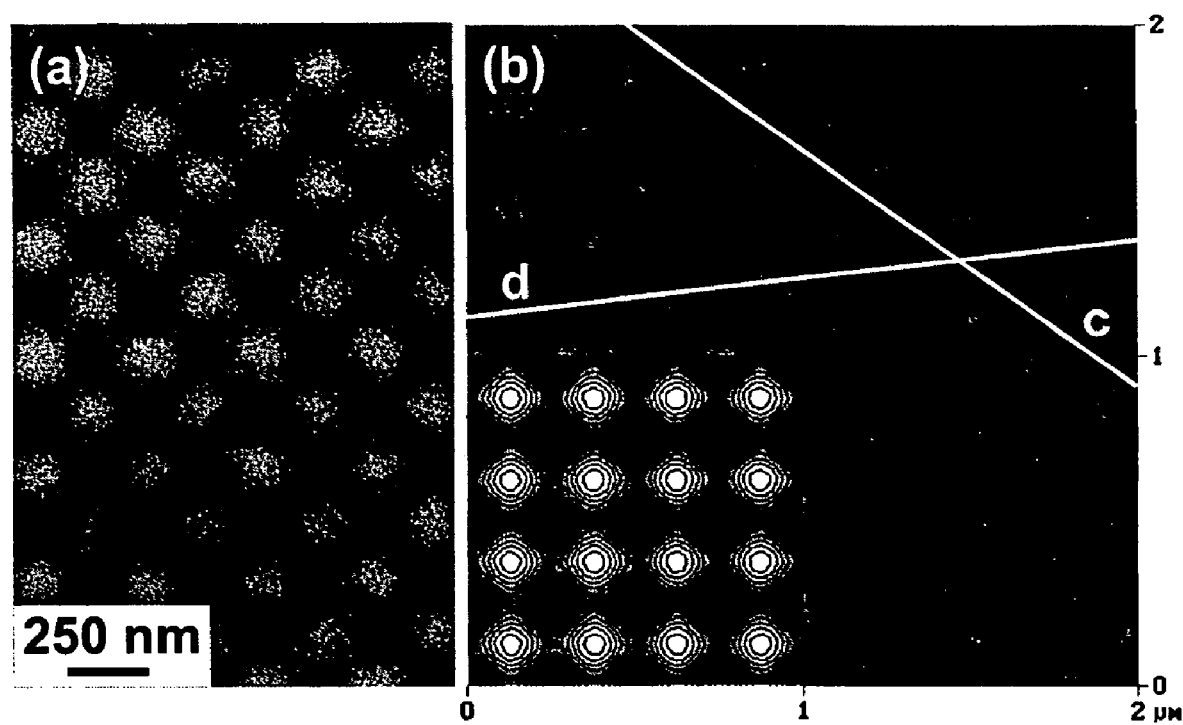
FIGS. 1(a) and 1(b) are respectively scanning electron and scanning force microscope images showing height images of a 2-D nanowell pattern of photoresist prepared by holographic lithography.

It is to be understood that unless otherwise indicated, this invention is not limited to specific materials, processing conditions, manufacturing equipment or the like, as such may vary. It is also understood that the terminology used herein is for the purpose of describing particular embodiments only and is not intended to be limiting.

Definitions

The term "aspect ratio" is used herein in its conventional sense to refer to the ratio of the height or depth to width (or diameter) of an object.

The term "nanoparticle" is used herein in its conventional sense to refer to ultra-fine particles (below 50 nm).

The Process

The invention relates to a fabrication method that enables control of the number of ultra-fine particles that are arranged into wells prefabricated on substrates.

The nature of the substrate is not critical for the process although it may affect the method of deposition of the photoresist and the solvent used for the deposition. The most commonly used substrate has been silicon wafers. Depending upon the application, these wafers can be coated with other layers such as dielectric layers, photoresist or polyimide, metal oxides, thermal oxides, conduction materials, insulating materials, ferroelectric materials or other materials used in the construction of electronic devices. Materials for substrates other than silicon include, but are not limited to, GaAs, InGaAsP, InGaP, or any other alloys of Ga.

The substrate is then coated with a layer of a suitable photoresist with a suitable thickness. Photoresists are organic polymers which become soluble when exposed to ultraviolet light. Any number of photoresists can be used depending on how thick a layer of photoresist is required. Photoresists are essentially positive or negative type. Negative photoresists are a type of photoresist that becomes relatively insoluble to developers when exposed to light. In contrast, positive photoresists have a higher developer dissolution rate after being exposed to light. Positives are more commonly used because they do not swell during development; they are capable of finer resolution, and they are reasonably resistant to plasma processing operations. Examples of positive photoresists include, but are not limited to, Shipley 3001, 3612 and 220-7. The photoresist is coated onto the substrate using any number of conventional techniques such as spin-coating, dipping or other coating methods.

The photoresist coated-substrate is then typically but not necessarily prepared using optical, X-ray, electron beam, LIGA, or holographic lithography. Holographic lithography involves making patterns using a beam of laser light that interferes with itself reflected by a mirror. The dimensions of the pattern produced are determined by the number of beams used. Thus, a 2-D pattern of cylindrical holes and or 1-D pattern of grooves can be produced. The final pattern achieved is determined by factors such as the wavelength of the laser light, the relative angles at which the beams are fired, and photoresist exposure time and thickness. Although other laser sources and wavelengths could have been chosen, we used a He—Cd laser operating at 325.0 nm. Once the pattern has been fabricated, the substrate is ready to be coated with micelles which contain the nanoparticles of interest.

Nanoparticle composition is dependent upon the application. For example, rare earth magnetic materials composed of single domain particles could be patterned in this process and used in computer memory applications. Ferroelectric nanoparticle components could be used for capacitors. Cobalt particles were used here because of their useful magnetic properties. Other materials include but are not limited to FeO, $Fe_2O_3$, $Fe_3O_4$; FePt, MnAs, Ga—Sb, Au, Ag, Pt, Pd, and Ni. These nanoparticles can be synthesized in inverse micelles of polystyrene block copolymers in a solution of toluene. Although the invention used polystyrene-block-poly(2-vinylpyridine) (PS-PVP), any number of polystyrene block copolymers could have been used. When dissolved in toluene, these molecules aggregate into micelles with a PS shell and a PVP core with a controllable hydrodynamic radius.

The micelle-nanocluster solution is then used to coat the prefabricated substrate. Coating can be performed by casting, dipping, or spin-coating. For instance spin-coating speeds such as 1,000 rpm to greater than 10,000 rpm can be employed to control the thickness of the coating. Nevertheless, whichever technique is used, it is possible to fine tune the number of nanoparticles that will finally coat the wells by adjusting the nanoparticle concentration in the solution used in the coating process. Nanoparticle number per well may vary depending upon the nanoparticle/micelle composition. Nanoparticle concentrations of less than 0.1 mg/ml to greater than 1 mg/mL can be used. Examples in this application used Co nanoparticles concentrations of between 0.125 mg/ml and 1 mg/mL.

The coating method results in micelles/nanoparticles being positioned within fabricated substrates through capillary forces that act at the contact line between a micelle/nanoparticle solution and a wall. However, the prefabricated substrate may also contain micelle-free regions. This results from a specific combination of the resist, the solvent, the micelle-forming polymer with respect to their interactions and surface energies.

The following examples set forth for purposes of illustration only and are not to be construed as limitations on the invention except as set forth in the appended claims.

EXAMPLE 1

A PS-PVP copolymer with a weight average molecular weight of 65,200 g/mol, a polydispersity of 1.04, and a PVP volume fraction of 0.12 was synthesized by sequential anionic polymerization technique as previously documented. (H. Yokoyama et al. 2000). Co nanoparticles were synthesized in inverse PS-PVP micelles in toluene by partial pyrolysis of dicobalt octacarbonyl, $Co_2(CO)_8$, at 115° C. as reported elsewhere. (F. S. Diana et al.). The synthetic scheme is a variation of the method described by Puntes et al. (2001). Monodisperse amorphous Co nanoparticles with an average diameter of 20±2 nm were obtained after a reaction time of 2 min. The structure of micellar nanoparticles obtained is similar to that of the PS-PVP micelles loaded with tetrachloroauric acid reported by Spatz et al. (2000).

Two-dimensional periodic nanopatterns were fabricated by means of holographic lithography. The beam from a He—Cd laser operating at wavelength of 325.0 nm was expanded and spatially filtered using a pinhole in order to select only the coherent central zone. This spot was aligned towards the center of an interferometer with mirror and sample planes forming 90° dihedral angle. The body of the interferometer can be rotated around the dihedral axis in order to adjust the periodicity of the grating patterns, while double exposures at different sample orientations allow formation of grid patterns. (G. Gigli et al. 1998). A 50 nm thick layer of a photo sensitive chemical resistant to acid, specifically Shipley SPR 3001, was used as a positive photoresist on a GaAs substrate. Precise calibration of the exposure dose made possible the definition of grid well nanopatterns with good process latitude over a large area (2×2 cm²).

A toluene solution of nanoparticles was then dip-or spun-cast at different speeds onto these photoresist nanopatterns. Typically, a drawing rate of 100 µm/s was used for dip-casting and a spinning rate of 2,000 rpm was used for spin-casting. The nanoparticle arrays obtained were characterized by scanning force microscopy (SFM) and scanning electron microscopy (SEM). SFM was carried out using a Digital Instruments Multimode Scanning Probe Microscope with a Nanoscope IIIa controller in tapping mode. Field emission SEM was performed on JEOL 6340F at an accelerating voltage of 2 kV.

FIGS. 1(a) and 1(b) show SEM and SFM height images, respectively, of the 2D square lattice of nanowells obtained by holographic lithography. In FIG. 1(a), bright spots correspond to wells, while dark spots correspond to the wells in FIG. 1(b). The periodicity of the wells was 250 nm and the depth was 31 nm along line c and 39 nm along line d with about 10 nm of photoresist left at the bottom of the wells. The slight difference in the height of the photoresist pattern depending on the direction comes from the fact that the photoresist is double exposed at 90° to the beam with the same dose. This 2D pattern is consistent with the calculated 2D intensity profile shown in the inset of FIG. 1(b). The well aspect ratio in our study is below 0.3, which is much smaller than those in the works of Spatz et al. (2002) and Misner et al.'s (2003).

Figure 2:
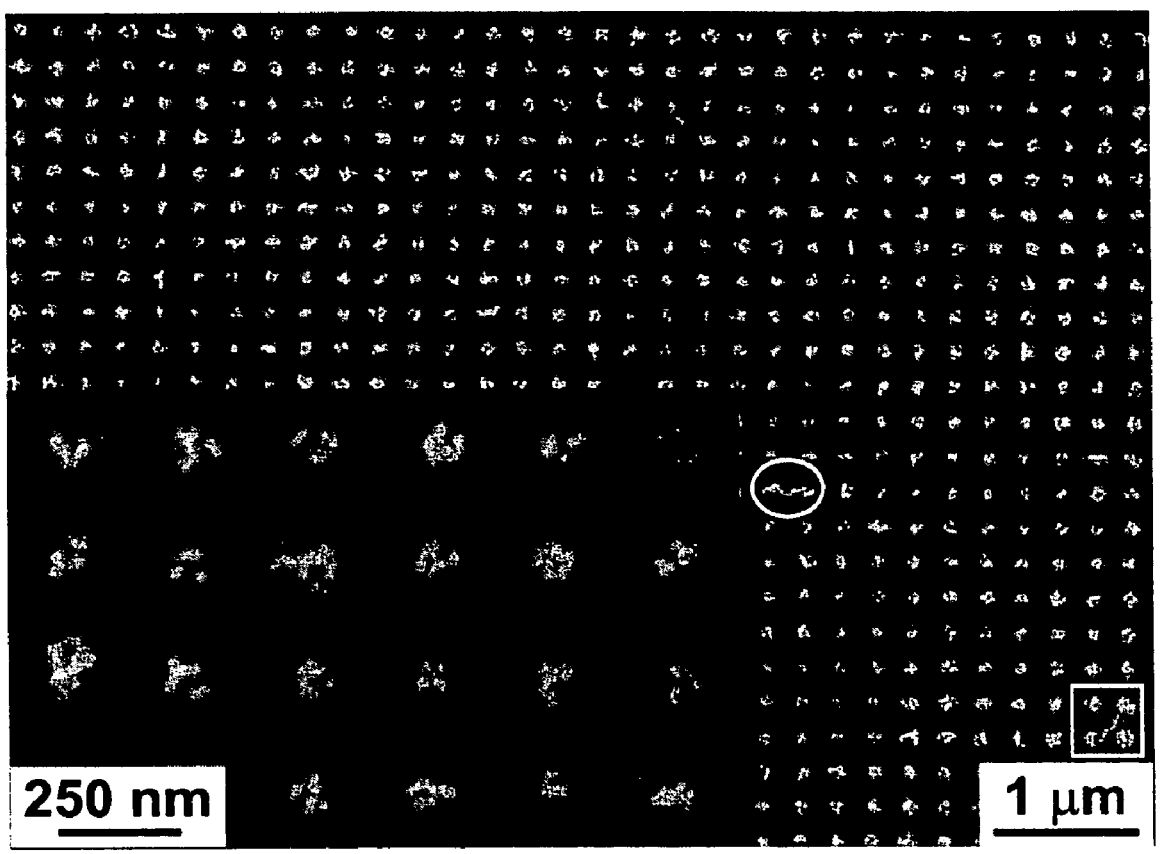
FIG. 2 is a scanning electron microscope image of cobalt nanoparticle arrays obtained by dip-coating at 100 μm/s onto a photoresist hole lattice, along with an inset showing a higher magnification.

FIG. 2 shows an SEM image of the self-assembly of Co nanoparticles obtained by dip-coating the nanoparticle solution (c=1.0 mg/ml) onto the photoresist well patterns at 100 μm/s. The inset shows the same region with a larger magnification. The nanoparticles are selectively positioned in the wells. The higher magnification SEM image clearly shows 6±2 particles per well on average. The selective positioning of the nanoparticles in our study is consistent with the capillary force effect. During dip- or spin-coating, the solvent-air interface recedes along the photoresist surface with solvent in the nanowells evaporating last. The capillary force of the receding solvent-air interface acts on the nanoparticles during this process and collects them in the wells. This observation is consistent with the results of Spatz et al. (2002) and Misner et al. (2003). However, it is surprising that the capillary forces still work for the pattern with the very low aspect ratio (a~0.3) of the wells in our study.

The PS shells of the Co nanoparticles as well as the solvent, toluene, are hydrophobic, while the photoresist surface is slightly hydrophilic due to the hydroxyl (—OH) groups in the Novolac resin. This leads to the repulsive interaction between the photoresist surface and the nanoparticle droplets and further helps the assembly of the nanoparticles into the wells. Xia and coworkers (Y. Yin et al. 2001) reported poor self-assembly of —NH$_2$ terminated PS colloids at pH=6.5 because the capillary forces are not strong enough to drive the particles into the wells due to the strong attractive interaction between the colloids and the photoresist substrate. We observed that a photoresist well lattice with no photoresist left in the wells (a thin natural oxide layer of GaAs substrate exposed in the wells) gives nearly the same result (not shown here) as those shown in FIG. 2. This implies that capillary force is more effective in the selective self-assembly process in our system than the repulsive interaction between the nanoparticles and the photoresist.

In FIG. 2, only a few defects are observed in the area of 7.8×5.8 μm$^2$. The circle in FIG. 2 indicates a defect where two nanoparticle arrays in adjacent wells are connected by a chain aggregate of particles, while the rectangle shows another type of defect where nanoparticles are distributed around the wells as well as in the wells. These kinds of defects originate from the nanoparticles aggregates present in the solution rather than the pattern roughness or the possible flow instability during dipping. The degree of aggregation in Co nanoparticle solution, particularly chain aggregates, could be controlled by changing the aging time at room temperature as well as the reaction time as documented elsewhere (F. S. Diana et al.).

EXAMPLE 2

The spin-coating method was also used to make the self-assembled nanoparticle arrays on the photoresist patterns, and the self-assemblies obtained at 2,000 rpm are shown in the SFM height images of FIG. 3(a)-(c). When a dilute solution (c=0.125 mg/ml) was used, arrays with a sparse population of nanoparticles (2±2 particles per well) were obtained without any particles positioned on top of photoresist mesa regions, as shown in FIG. 3(a). In FIG. 3(a), some wells are shown containing only a single nanoparticle. A more concentrated solution (c=0.50 mg/ml) results in arrays with a dense population of nanoparticles (9±2 particles per well), as shown in FIG. 3(b). The nanoparticle number per well is linearly proportional to the solution concentration at low concentrations as shown in FIG. 4. This implies that the nanoparticle density in the wells can be controlled by simply changing the nanoparticle concentration in the solutions used. If the concentration is further increased to 1.0 mg/ml, however, the number of nanoparticles per well deviates from the linear relationship and levels off to 14±2 as shown in FIG. 4. This is because each well can accommodate only a certain number of nanoparticles due to the limitation of its size. Excess particles remain on top of mesa producing defect particles as shown in FIG. 3(c).

The invention demonstrates that capillary forces of a receding liquid front can be used to selectively self-assemble nanoparticles into photoresist nanowells.

REFERENCES

The following publications are referred to in the above specification:

Akinaga, H., S. Miyanishi, K. Tanaka, W. Van Roy, and K. Onodera, Appl. Phys. Lett. 76, 97 (2000).
Diana, F. S., S.-H. Lee, R. A. Rachel, E. J. Kramer, and P. M. Petroff, Nano Lett. 3, 891 (2003).
Gigli, G., R. Rinaldi, C. Turco, P. Visconti, R. Cingolani, and F. Cacoalli, Appl. Phys. Lett. 73, 3926 (1998).
Guo, Q., X. Teng, S. Rahman, and H. Yang, J. Am. Chem. Soc. 125, 630 (2003).
Hidber, P. C., W. Helbig, E. Kim, and G. M. Whitesides, Langmuir 12, 1375 (1996).
Hua, F., T. Cui, and Y. Lvov, Langmuir 18, 6712 (2002).
Hua, F., Y. Lvov, and T. Cui, Nano Lett. 2, 1219 (2002).
Lee, I., H. Zheng, M. F. Rubner, and P. T. Hammond, Adv. Mater. 14, 572 (2002).
Lin, X. M., R. Parthasarathy, and H. M. Jaeger, Appl. Phys. Lett. 78, 1915 (2001).
Misner, M. J., H. Skaff, T. Emrick, and T. P. Russell, Adv. Mater. 15, 221 (2003).
Palacin, S., P. C. Hidber, J.-P. Bourgoin, C. Miramond, C. Fermon, and G. M. Whitesides, Chem. Mater. 8, 1316 (1996).
Puntes, V. F., K. M. Krishnan, and A. P. Alivisatos, Science, 291, 2115 (2001).
Spatz, J. P., V. Z.-H. Chan, S. Mößmer, F.-M. Kamm, A. Plettl, P. Ziemann, and M. Möller, Adv. Mater. 14, 1827 (2002).
Spatz, J. P., S. Mössmer, C. Hartmann, M. Möller, T. Herzog, M. Krieger, H.-G. Boyen, P. Ziemann, and B. Kabius, Langmuir 16, 407 (2000).
Sun, S., C. B. Murray, D. Weller, L. Folks, and A. Moser, Science, 287, 1989 (2000).

Suzuki, K., R. A. Hogg, and Y. Arakawa, J. Appl. Phys. 85, 8349 (1999).

Werts, M. H. V., M. Lambert, J.-P. Bourgoin, and M. Brust, Nano Lett. 2, 43 (2002).

Yin, Y., Y. Lu, B. Gates, and Y. Xia, J. Am. Chem. Soc. 123, 8718 (2001).

Yokoyama, H., T. E. Mates, and E. J. Kramer, Macromolecules 33, 1888 (2000).

Zheng, H., I. Lee, M. F, Rubner, and P. T. Hammond, Adv. Mater. 14, 569 (2002).

The invention claimed is:

1. A fabricated device comprising:
a photoresist coated-substrate formed with wells through its surface, said wells having gradually sloping walls and an aspect ratio of less than 0.37, and micelles enclosing nanoparticles disposed in said wells.

2. The fabricated device of claim 1 in which said wells have an aspect ratio less than or equal to 0.3.

3. The fabricated device of claim 1 wherein the nanoparticles are metal nanoparticles.

4. The fabricated device of claim 3 wherein the metal is cobalt.

5. The fabricated device of claim 1 wherein said nanoparticles have a diameter of 0.5 to 500 nm and said wells are less than 1 μm in diameter.

6. The fabricated device of claim 1 wherein the diameter of said micelles in dry condition is 0.01 to 1.0 times the diameter of said wells.

7. The fabricated device of claim 1 wherein the diameter of said micelles in solution is less than 1.5 times the diameter of said wells.

8. The fabricated device of claim 1 wherein said wells are arranged in an ordered manner.

9. The fabricated device of claim 1 wherein said wells are arranged in a random manner.

10. The fabricated device of claim 1, wherein said wells have a bottom surface comprising of said photoresist.

11. The fabricated device of claim 1, wherein said wells have a bottom surface where the photoresist has been removed.

12. A fabricated device comprising:
a GaAs substrate coated with a photoresist layer of a photo sensitive chemical resistant to acid, said substrate and photoresist layer defining wells that have gradually sloping walls and an aspect ratio of less than 0.37, and micelles within said wells, said micelles incorporating cobalt nanoparticles in the device.

13. The fabricated device of claim 12 wherein said wells are in the form of periodic elongate grooves.

14. The fabricated device of claim 12 wherein said wells are 100-200 nm deep.

* * * * *